United States Patent [19]

Jakobsen et al.

[11] Patent Number: 4,595,550
[45] Date of Patent: Jun. 17, 1986

[54] METHOD FOR THE CRYSTALLIZATION OF THERMOPLASTIC MATERIAL

[75] Inventors: Kjell M. Jakobsen, Skanör; Torsten Nilsson, Löddeköping, both of Sweden

[73] Assignee: PLM AB, Malmö, Sweden

[21] Appl. No.: 541,520

[22] Filed: Oct. 13, 1983

[30] Foreign Application Priority Data

Oct. 14, 1982 [SE] Sweden ................................ 8205829

[51] Int. Cl.$^4$ .............................................. B29C 55/22
[52] U.S. Cl. ..................... 264/292; 264/323; 264/340; 264/532; 425/529
[58] Field of Search ............. 264/292, 323, 532, 550, 264/340; 425/DIG. 218, 529

[56] References Cited

U.S. PATENT DOCUMENTS

| | | | |
|---|---|---|---|
| 3,496,143 | 2/1970 | Siggel et al. | 264/292 |
| 3,514,468 | 5/1970 | Sutcliffe et al. | 264/323 |
| 4,112,042 | 9/1978 | Brocklehurst | 264/323 |
| 4,363,611 | 12/1982 | Austen et al. | 425/97 |
| 4,381,279 | 4/1983 | Jakobsen et al. | 264/292 |

FOREIGN PATENT DOCUMENTS 2052365 1/1981 United Kingdom ................ 264/292

Primary Examiner—James Lowe
Attorney, Agent, or Firm—Roberts, Spiecens & Cohen

[57] ABSTRACT

A method of forming a preform having crystallized thermoplastic material from a blank of orientable thermoplastic material, such as polyethylene terephthalate, which comprises laterally displacing first and second regions of a blank, preferably tubular, of orientable thermoplastic material to form an intermediate region between the displaced regions having outer surfaces facing in opposite directions. Pressure is applied to the outer surfaces of the intermediate region to relatively displace these outer surfaces longitudinally of the blank while concurrently reducing the thickness of one of the first and second regions to the value of the thickness that the material would obtain if freely stretched to flow to achieve crystallization of the material in the aforesaid one region. The material in the one region, during the reduction of thickness thereof flowing from the orientable material thereof to a transition zone to form the one region which is reduced in thickness and is elongated in length.

10 Claims, 24 Drawing Figures

METHOD FOR THE CRYSTALLIZATION OF THERMOPLASTIC MATERIAL

FIELD OF THE INVENTION

The present invention relates to a method and a device for the realisation of crystallisation of material in the wall of an item or a preform which is formed by a blank, and where the preform is preferably intended to be reshaped into a container. The blank consists of thermoplastic material suitable for crystallisation and preferably of polyethylene terephthalate. More specifically, the invention relates to providing the wall of the blank with two laterally displaced material regions, and for the crystallisation of the material, by means of a mechanical moulding device, to reducing the thickness of the material of the wall, commencing in that region of the wall where the two material regions are displaced laterally relative to each other.

DESCRIPTION OF PRIOR ART

In many technical applications for moulding products of thermoplastic material there is a need during the moulding process, or alternatively in the manufactured product, to achieve exact location of a transition between material crystallised by means of orientation and material which has not been crystallised by means of orientation, i.e. usually primarily amorphous material. Examples of such a technical application are the production of containers of thermoplastic material where the container is manufactured from preforms of primarily amorphous material. The preforms are realised, e.g. by injection moulding, by thermoforming of, for example, sheets of the thermoplastic material, or by sealing one end of cut pieces of extruded tubes whose other end is moulded in order to form the orifice section of the container in the process of production.

Polyesters, polyamides or similar materials are examples of thermoplastic materials to which the invention is applicable. Examples of suitable polyesters or polyamides are polyethylene terephthalate, polyhexamethylene adipamide, polycaprolactam, polyhexamethylenesebacamide, polyethylene-2,6 and 1,5-naphthalate, polytetramethylene-1,2-dioxybenzoate and copolymers of ethylene terephthalate, ethylene isophthalate and other similar polymeric plastics. The invention is however not restricted solely to the materials specified, but is also applicable to many other thermoplastic materials, e.g. polyvinyl alcohol, polycarbonates and combinations of the aforementioned materials.

The present invention is described hereinafter in conjunction with the thermoplastic material polyethylene terephthalate (generally abbreviated henceforth as PET). The values of temperatures, stretching conditions, reductions of thickness of the material, etc. that are stated in the description relate to this material. It is however well-known that a large group of thermoplastic materials display characteristics that are similar to those of PET, and the invention as such is therefore also applicable to these materials. It is necessary that values stated in the following description for temperatures, stretching conditions, thickness reductions, etc. in the application of the invention are adapted to that which applies to each respective thermoplastic material, in order to achieve effects corresponding to those which are stated in the continuing description of the invention.

In order to facilitate comprehension of this approach to this problem and the invention, some characteristic properties of the polyester polyethylene terephthalate are hereinafter described. It is known from the literature, e.g. Properties of Polymers, D. W. van Krevelen, Elsevier Scientific Publishing Company, 1976, 2nd revised edition, that the properties of the material are altered in the orientation of amorphous polyethylene terephthalate. Certain of these changes are revealed in the diagrams, FIGS. 14.3 and 14.4 on pages 317 and 319 in the book "Properties of Polymers". The designations which are employed in the following discussion correspond to those that are to be found in the aforementioned book.

PET like so many other thermoplastic materials can be oriented by the stretching of the material. Usually, such stretching takes place at a temperature above that of the glass transition temperature (TG) of the material. The strength characteristics of the material are improved by the orientation. References in the literature show that in the case of the thermoplastic PET an increase in the stretching ratio, $\Lambda$, i.e. the ratio between the length of the stretched material and the length of the unstretched material, also causes an increase in the improvement of the properties of the material. With an increase in the stretching ratio, $\Lambda$, from around twice to somewhat in excess of three times, the changes in the properties of the material are especially great. Strength in the direction of orientation is markedly improved, at the same time as the density $\rho$ as well as the crystallinity $Xc$ rise, and the glass transition temperature TG is increased. It can be seen from the diagram on page 317 that the material which has undergone a stretching equivalent to $\Lambda = 3,1$ is able to withstand a force per unit of surface corresponding to $\sigma = 10$ with very little elongation, while for $\Lambda = 2.8$ the elongation is very much greater.

The diagram cited above shows the changes that are obtained in monoaxial orientation of the material. In biaxial orientation similar effects are obtained in each direction of orientation.

The reference in the literature (cf e.g. table 14.1, page 319) further reveals that there obtain such relations between orientation, density and crystallisation that crystallisation provides a measure of the orientation of the material. The crystallisation that is referred to in the reference in the literature is that which occurs during the orientation of the material.

In addition to the crystallisation obtained by the orientation, the material can obtain an supplemantary thermal crystallisation by heating. The heating could be made both before and after the orientation. In the following the term crystallisation will be taken as meaning solely that crystallisation which is linked to orientation by stretching and/or thickness reduction of the material, unless otherwise explicitly stated. The crystallisation occurring by means of stretching and/or thickness reduction is often termed "stretch crystallisation" in the remainder of the description. The term "thermocrystallisation" will be used for the supplementary thermal crystallisation.

Improved material properties equivalent to those obtained by stretching described above, are also obtained when the thickness of the material is reduced by means of e.g. mechanical forming devices and the reduction is equivalent to the reduction the material obtains when it is stretched so that material flow takes place. When the material is stretched so that material flow occurs, and the material prior to the flow is at a temperature below the glass transition temperature TG, the transition (flow zone) is formed between oriented (crystallised) and non-oriented (non-crystallised) material as a relatively short region in the direction of stretching, in which region the thickness of the material is reduced. In the case of e.g. a draw rod a reduction of diameter of around three times takes place in the flow zone. During drawing the flow zone moves continuously into the non-oriented material, at the same time as the material which has already undergone flow absorbs the tensile forces of the rod without additional greater residual extension.

In the case of bottles certain external orifice diameters with associated thread are standardised, thereby determining, in accordance with currently employed general techniques in the application of the moulding procedure described by way of introduction, the maximum diameter which can be permitted in the blow-moulded body of the container. The reason for this is explained in greater detail as follows. In order to obtain an amorphous primary material in the preforms, the material after injection moulding or extrusion must be cooled rapidly below the glass transition temperature TG. With an excessively great wall thickness the thermal conductivity of the material is insufficient to allow the required rapid cooling of the central portions of the wall and the centrally located material crystallises thermally and becomes opaque. Such opaque material is difficult to reshape. The maximum possible wall thickness of the preforms is thus theoretically up to approximately 9 mm. In practice, however, wall thicknesses below 4 mm are often employed. In blowing a preform with an excessively thick wall material, problems arise due to the cooling of the material during the actual blowing process and before the material reaches the wall of the mould. The blown container is no longer as clear as glass, but possesses white, non-transparent portions. In order to obtain a container by blowmoulding, which has the required ability to withstand strain and penetration of the container wall, the thickness of the wall of the finished container must not fall below a certain level. In accordance with generally applied techniques it is moreover not possible to reduce the outer diameter of the tube during moulding of the orifice section of the preform. It thereby follows that the required diameter of the orifice of the blow-moulded container determines the diameter of the preform, and thus the maximum diameter of the blowmoulded body of the container. When bottles are required for large volumes preforms of greater axial length are used, at least in the case of preforms of amorphous material produced from extruded tubes, once the maximum possible diameter of the body of the container with regard to the orifice diameter has been attained. In addition to the disadvantage of a certain instability in the finished product, the extension in length implies an unsatisfactory utilisation of the quantity of material in the body of the container, since the required quantity of material per unit of volume of storage space is greater than would have been needed in the event of an adaptation of both the diameter and the length of the body of the container to actual volume need. The unnecessarily large surface of the container also causes a corresponding increase in the total carbon dioxide penetration in the storage of carbonated drinks.

A problem in the production of containers on the basis of preforms is that of providing a sufficient amount of material in the bottom section of the preform to form the bottom section of the container, when the preform is blown to the container. Especially when the container body has a large diameter, the lack of material is evident.

In order to make the best use of the properties of the material efforts are made to ensure that the diameter of those parts of the preform which form the actual body of the container after moulding, have a value such that the material in the blow-moulded body of the container is given the required orientation. In the case of containers of PET care is often taken to ensure that the material is stretched biaxially in conjunction with blow moulding so that the product of the stretchings is approximately nine times as a maximum.

It is known that when practising generally known techniques, the quantity of material in the orifice section is determined not by the calculated strains therein, but by the maximum diameter of the body of the container. As a rule this means a considerable surplus of material in the orifice section. For example, in a bottle of PET with a volume of one liter, the orifice section can in accordance with techniques currently applied contain up to 25% to 30% of the total quantity of material. Not withstanding the aesthetic overdimensioning of the orifice section this distribution of material also constitutes a waste of material, which is of consequence in the mass production of articles.

Using techniques currently applied, the orifice section and adjacent neck portions comprise non-oriented, i.e. usually amorphous material. This means that the material of the orifice section and the adjacent neck portions possess different properties than those of the body of the container. In the case of containers of PET, for example, the material in the orifice section has a glass transition temperature (TG) of around 70° C. while the material in the body of the container has a glass transition temperature of around 80° C. It thus follows that the material in the orifice section softens at a lower temperature than the material in the body of the container.

It was previously known that cold moulding of the orifice section of a blank moves material from the orifice section down into those regions of the blank which are later to comprise the wall portions of the body of the container. By this means a certain adaptation of the quantity of material in the orifice section to future strains is achieved, but neck portions occur between the actual body of the container and the orifice section, where the material is stretched less than three times. These neck portions thus consist in the moulded container of insufficiently oriented material, at the same time as the wall thickness is undesirably great. The material in the orifice section and the aforementioned neck portions also have a lower glass transition temperature than the material in the body of the container, which causes the previously mentioned disadvantage of lower softening temperature for the material in the orifice section and adjoining neck portions. This technique is known from the British publication No. GB 2.016.360.

It is known from U.S. Pat. No. 4,108,937 that a tubular blank closed at one end is injection moulded, and its other end is provided with a flared lip for fixing the blank in a subsequent blowing device, and where the tubular blank after certain reshaping is blown into a container. Material in the tubular section of the blank expands in a radial direction at a temperature above the glass transition temperature (TG) in order to form the orifice section of the container. A container moulded in the manner described has an orifice section and a neck portion where the material has undergone very little stretching and thus orientation, for which reason the previously stated disadvantages with respect to the orifice section of the container (excessively large quantity of material, lower glass transition temperature (TG) than in the body of the container) are still present. The invention described in U.S. Pat. No. 4,108,937 also has the disadvantage that only one part of the material content in the injection-moulded tubular blank is used in reshaping the blank to a finished container. Naturally, the waste of material which thus occurs is an economic disadvantage in the mass production of articles.

U.S. Pat. No. 4,264,558 reveals a procedure where a tubular preform of PET is reshaped into a container, and where the wall of the container is comprised of material that is stretched more than 1.5 times. The bottom section of the container consists of amorphous, non-oriented material while the neck portions of the container consist of material which has been oriented only to a slight degree. By means of heating and thus the obtained thermal crystallization the strength of the material in the non-oriented regions is improved, at the same time as the material becomes non-transparent.

A combination of the above-mentioned techniques still implies an undesirable over-dimensioning of the neck portions of the container at the same time as the latter possess properties diverging from the properties of the material in the actual body of the container.

The published patent application No. GB 2.067.952 reveals that mechanical devices can reshape a blank into the preform by reduction of the material thickness in order to achieve the preform, which during blowing forms a container with uniformly axially oriented material and which has largely the same glass transition temperature (TG) in both the orifice section and the body of the container. The publication, however, does not indicate any solution to the need to dissolve the link between the diameters of the orifice section of the moulded container and its body, and the over-dimensioning of the orifice section of the container which is thereby occasioned.

Similarly, the published patent application No. GB 2 052 367 discloses mechanical devices which reshape a blank into a preform by reduction of the material thickness, whereby a preform is achieved that during blowing forms a container with uniformly axially oriented material and which has largely the same glass transition temperature (TG) in both the orifice section and the body of the container. The publication discloses a technique limited to producing a preform from a blank, which preform forms a container during blowing-out whose orifice diameter is less than the diameter which is obtained in direct blowing-out of the blank into the container. The publication indicates a technique which is limited to blanks produced from extruded tubes which are cut and sealed in order to produce the blanks, while the technique is not applicable to injection-moulded blanks.

The published patent application No. GB 2.076.734 reveals the forming of an initial groove in which an annular pulling device is introduced, and where the pulling device in its movement from the initial groove reduces the material thickness during simultaneous crystallisation (orientation) of the material. The publication discloses a technique where the preform (the reshaped blank) mainly retains its original diameter.

SUMMARY OF THE INVENTION

The present invention removes those limitations that are present when practising prior art. By means of the invention a preform is achieved, which in blowing forms a container with an orifice section, neck portions and a body with diameters that are selected in principle independently of each other, and where the container consists of material with virtually the same properties (density, axial orientation, crystallisation, glass transition temperature, etc.). Moreover, the invention enables a dimensioning of the wall thicknesses in said parts of the container, adapted to expected mechanical and thermal strains. The material in the aforementioned parts of the container has a stretch crystallisation equivalent to that which is obtained when the material is stretched at least 2.5 times. The invention is independent of the production technique for the blank from which the preform is manufactured, and thus makes it possible to manufacture the preform from e.g. an injection-moulded blank, a thermoformed blank or a blank formed by an extruded tube.

The invention also makes it possible to produce a container with an orifice diameter virtually free of the diameter of the body of the container, and with the dimensions of the body of the container adapted to the storage volume of the container, in order to minimise the quantity of material in the container per unit of volume of storage space.

The invention also makes it possible to mould a container with an arbitrarily chosen shape of the neck section, where the material in the orifice section and in the neck section is oriented and has a stretch crystallisation in excess of 10%, obtained in that the thickness of the material is reduced and the material is thus extended in the axial direction of the blank at least 2.5 times approximately.

In accordance with the invention there is obtained a preform which has a cylindrical material portion, oriented in the axial direction of the preform and with a crystallisation exceeding 10% where the axial length of the crystallised cylindrical material portion is adapted to and in certain examples of applications of the invention is the same as the profile length of an axial section through the container shaped by the preform in respect of those material portions which in the moulded container are to be found in the region from the orifice edge of the container to the central bottom section of the container.

An essential advantage of the invention is that the transition to the stretched and crystallised material in the preform formed from the blank has a location whose portion is adapted to the final product that is moulded from the preform. The invention thus makes it possible to achieve a preform which always satisfies the demands that are made on it in order to optimise the utilisation of material in the container produced irrespective of its shape, (cf e.g. the difference in the shape of a jar and a bottle).

In accordance with the invention the wall of a blank is formed with a first material region, a second material region, and a transitional region located therebetween. In the transitional region the two first-mentioned material regions are displaced laterally relative to each other. By means of relative motion between a first part, and a second part, of a moulding device during simultaneous inclusion of material in the transitional region, the material thickness in a ribbon-shaped region is reduced to an extent which causes a material flow therein, whereby transitional zones are formed between material stretch-crystallised by the material flow and surrounding non-stretch-crystallised material. At least one of the transitional zones is moved in the blank by means of the mechanical moulding device and during its abutment against material in the transitional zone and during reduction of the wall thickness of the material to a residual material thickness corresonding at most to around 2/5 of the original thickness. The material which has undergone reduction in thickness has in reduction obtained a stretch crystallisation which is at least 10% and a maximum of around 17%.

In a preferred embodiment of the invention the relative movement of the transitional zones takes place in that the first part and the second part of the moulding device are moved relative to one another during abutment against the material in the transitional zones.

In yet another preferred embodiment of the invention the minimum distance between the first part of the moulding zone in the region for abutment against the one surface of the blank in the transitional zone, and the second part of the moulding device in the region for abutment against the opposite surface of the blank in the transitional zone, amounts, during the movement of the transitional zone in the blank, to a value equivalent at most to approximately half the thickness of the material prior to crystallisation.

In one embodiment of the invention the first material region, the second material region and the transitional region are disposed in a tubular blank whose cross-section in the transitional region has inner and outer lines of limitation whose lengths are altered in the axial direction of the blank. The cross-section is in certain applications circular, rectangular or square, and has in other applications the shape of any desired polygon or curved surface.

In an alternative embodiment of the invention the transitional region is formed during injection moulding of the blank, while in another embodiment of the invention the transitional region is formed by the reshaping of a primarily tubular preform which in certain examples of application is produced from an extruded tube, and in other examples it is produced by the thermoforming of a sheet of thermoplastic material. Reshaping of the blank into a preform usually takes place with retention of the primarily amorphous structure of the material. The blank is preferably sealed at one end prior to reshaping.

In yet another embodiment of the invention the reshaping device is disposed with an outer annular pulling device and with an inner mandrel that cooperates with it. The pulling device is applied to an outer surface of the transitional region and is moved in the axial direction of the blank during reduction of the distance from the outer surface of the mandrel. This reduces the wall thickness of the material of the blank in a region between the pulling device and the mandrel to a residual maximum thickness equivalent to about 2/5 of original, whereby the material crystallises in a ribbon-shaped region in the transitional region, and transitional zones between non-crystallised and crystallised material are formed in the transitional region. During the continued movement of the pulling device relative to the mandrel, the pulling device moves the one transitional zone in the axial direction of the blank during reduction of the thickness of the material enclosing the mandrel and during crystallisation of this material.

In an alternative embodiment of the invention the moulding device is disposed with an inner annular pulling device and with a sleeve cooperating therewith that encloses the blank. The pulling device is applied to the inner surface in the transitional region of the blank and is moved in the axial direction of the blank during reduction of the distance from the inner surface of the sleeve. This reduces the wall thickness of the material of the blank in a ribbon-shaped region between the pulling device and the sleeve to a residual maximum thickness equivalent to about 2/5 of the original, whereby the material crystallises in a ribbon-shaped region in the transitional region and transitional zones between non-crystallised and crystallised material are formed in the transitional region. During the continued movement of the pulling device relative to the sleeve the pulling device moves the one transitional zone in the axial direction of the blank during reduction of the thickness of material enclosed by the sleeve and during crystallisation of this material.

In yet another alternative embodiment of the invention the mandrel is disposed with a primarily tubular outer surface which forms a gap with the inner surface of the pulling device in the region where said inner surface has minimal circumference. This region has in certain embodiments a relatively restricted axial length. In the relative movements of the mandrel and the pulling device the gap is moved along the cylindrical surface. Immediately after the formation of the ribbon-shaped region of crystallised material the width of the gap reaches a value equivalent to a maximum of around 2/5 of the original thickness of the material in the blank, and in the subsequent continued relative movement the width of the gap amounts to a maximum of about half the original thickness of the material. During the movement of the gap along the cylindrical surface of the mandrel the thickness of the material in the wall of the blank is reduced during the crystallisation of the material in the wall.

In yet another embodiment of the invention the sleeve in the moulding device is shaped with a transitional surface between two primarily tubular inner surfaces with divergent circumferences. The surface with the largest circumference usually has a very small axial length and is completely absent in certain applications. The transitional surface forms the pulling device of the moulding device. The mandrel is also disposed with a transitional surface between two primarily tubular outer surfaces with differing circumferences. Between the inner surfaces of the sleeve and transitional surface on the one hand, and the outer surfaces of the mandrel and transitional surface, on the other hand, there is thereby formed a gap-shaped space whose circumference alters in the region of the transitional surfaces. The sleeve is further disposed with a counterhold moveable in the axial direction of the sleeve. In an initial position the counterhold assumes an upper position for the reception of an upwards open tubular blank during simultaneous enclosure by the sleeve of at least the bottom portion of the blank. During the initial stage of the reshaping of the blank by the axial movement of the mandrel relative to the sleeve, the counterhold, and thus the blank, are fixed in their initial positions, whereby the mandrel during its motion increases the circumference of the blank in a region at least closest to the orifice of the blank. By this means, the transitional region is formed in the blank between two primarily tubular material portions with divergent circumferences.

In an alternative embodiment of the invention the sleeve is preferably disposed with a primarily tubular inner surface whose circumference increases towards the outer surface of the pulling device (mandral) in the region where the surface has the greatest circumference. This region has in certain applications a relatively limited axial length. In the relative movement of the moulding devices the gap is moved along the tubular inner surface. Immediately after the formation of the ribbon-shaped region of crystallised material, the gap width reaches a value of a maximum of around 2/5 of the original thickness of the material in the blank, and in the subsequent continuing relative movement the gap width amounts to a maximum of around half the original thickness of material. During the movement of the gap along the cylindrical surface of the sleeve the thickness of material in the wall of the blank is reduced during crystallisation of material in the wall.

In yet another embodiment of the invention the mandrel in the moulding device is shaped with a transitional surface between two primarily tubular outer surfaces with divergent circumferences. The surface with the largest circumference usually has a very small axial length and is completely absent in certain applications. The transitional surface forms the pulling device of the moulding device. The sleeve is also disposed with a transitional surface between two primarily tubular inner surfaces with differing circumferences. Between the inner surfaces of the sleeve and transitional surface, on the one hand, and the outer surfaces of the mandrel and transitional surface, on the other hand, and with the sleeve and the mandrel in the position relative to one another, which corresponds to the position immediately before the reduction of the thickness of material in the transitional region of the blank commences, there is thereby formed a gap-shaped space whose circumference alters in region of the transitional surfaces. The moulding device is further disposed with a reception device axially adjustable relative to the sleeve and the mandrel. With the blank placed in the reception device, it encloses at least one material region in the vicinity of the bottom of the blank. During the initial stage of the axial movement of the mandrel towards the orifice of the blank, the sleeve accompanies the mandrel in its movement, by which means the sleeve during inclusion of the material in the blank in the region closest to the orifice of the blank, reduces the circumference of the blank in said region, in that the material is enclosed in the gap that forms between the sleeve and the mandrel. There thus forms in the blank a material region with a smaller circumference than the material region of the blank closest to the bottom section of the blank together with a transitional region between these two material regions. The position of the transitional region relative to the bottom of the blank and the edge of the orifice of the blank respectively, is determined by the axial setting of the reception device.

In yet another embodiment of the invention the mandrel is disposed with a counterhold that is axially moveable relative to the mandrel. The movement of the counterhold is linked to the movement of the mandrel so that the counterhold abuts the bottom of the blank and fixes the blank against the reception device mentioned in the preceding paragraph, at least during the movement of the mandrel relative to the sleeve for reduction of the thickness of material in the transitional region.

BRIEF DESCRIPTION OF THE DRAWING

The invention is further described with reference to the drawing, wherein.

DETAILED DESCRIPTION OF PREFERRED EMBODIMENTS

Figures 1A, 1B:
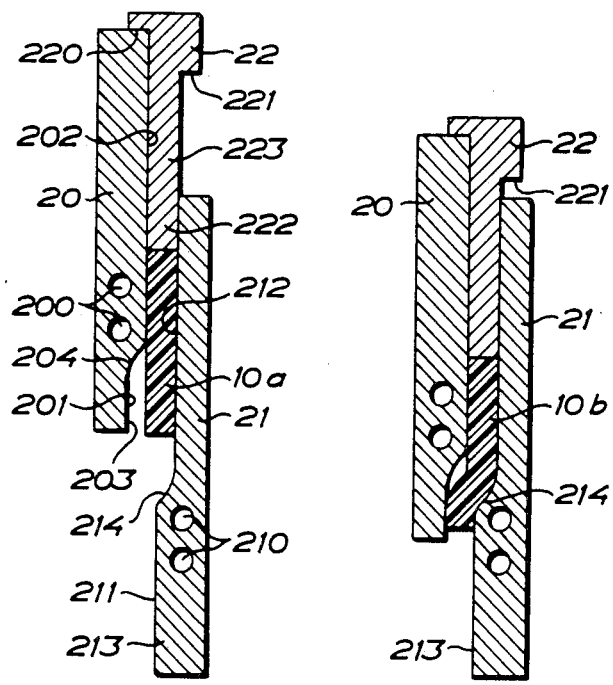
FIGS. 1 $a$-$f$ are diagrammatic sections through a device for crystallisation of material in a blank, FIGS. 2 $a$-$f$ are diagrammatic sections through an alternative device for crystallisation of material in a blank, FIGS. 3 $a$-$b$ are sections through the blank just when the flow of material begins for formation of a ribbon-shaped material region of crystallised material, FIGS. 4 $a$-$e$ are sections through a moulding device in successive moulding positions for crtystallisation by reduction of the thickness of material in a blank where the inner circumference of the orifice section is increased in conjunction with reshaping the blank, and FIGS. 5 $a$-$e$ are sections through a moulding device in successive moulding positions for crystallisation by reduction of the thickness of material in a blank where the inner circumference of the orifice section is reduced in conjunction with reshaping the blank.
Figure 1C:
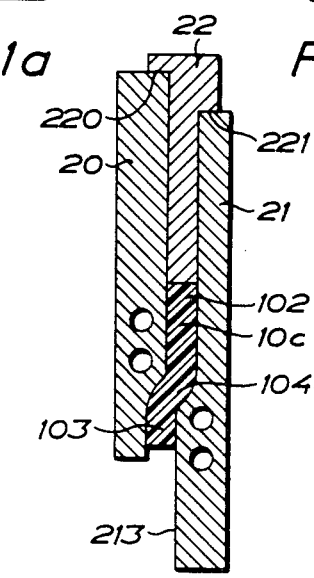
Figure 1D:
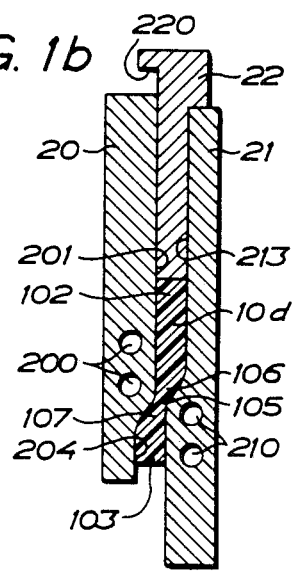
Figure 1E:
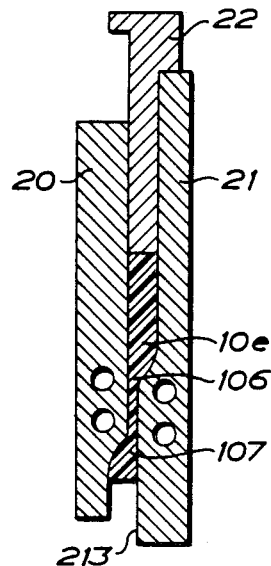
Figure 1F:
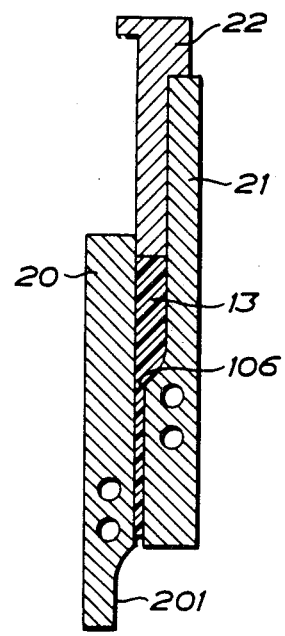
Figure 2A:
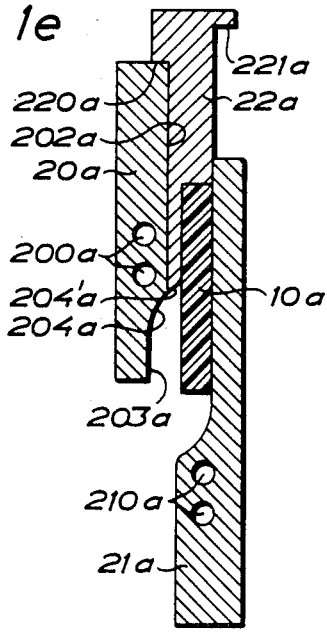
Figure 2B:
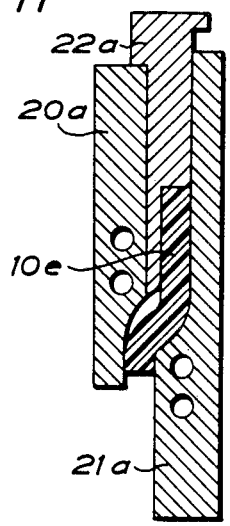
Figure 2C:
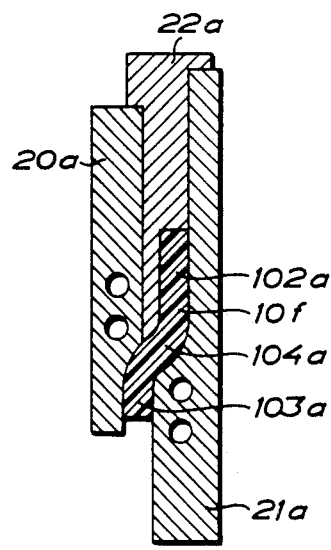
Figure 2D:
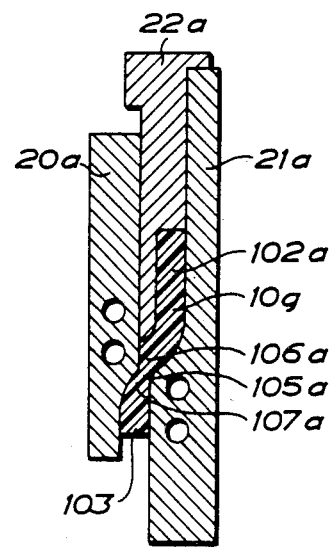
Figure 2E:
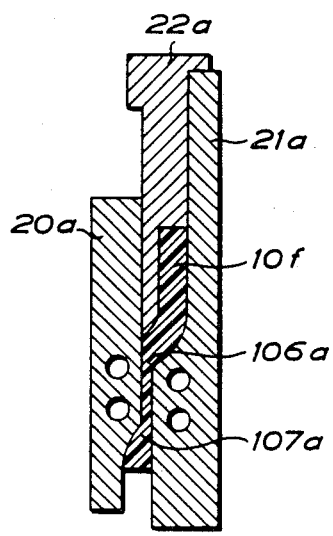
Figure 2F:
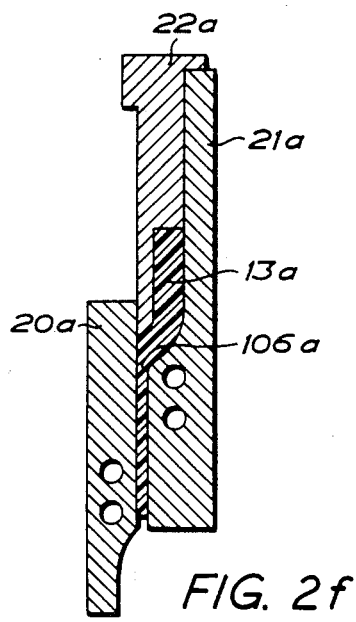

FIGS. 1$a$-1$d$, 2$a$-2$f$ and 3$a$-3$b$ show both the method in accordance with the invention for crystallisation of material in the wall of a blank and a diagrammatic illustration of a device for such crystallisation. The figures show an embodiment of a device, in which the material in the primarily flat blank is reshaped into an intermediate form, in which the blank has two laterally displaced material regions, and in which the material in one of these material regions is crystallised by reduction of the thickness of material.

FIGS. 1 $a$-$f$ show a moulding and crystallisation device hereinafter termed a moulding device, composed of a first part 20, a second part 21 and a drive and positioning device 22, hereinafter termed a positioning device. The blank 10 is completely or partially enclosed by the moulding device. Liquid channels 200,210 are disposed for regulation of the temperature in the first and second parts of the moulding device. The positioning device 22 is disposed with a lug 220 for abutment against the first part 20 of the moulding device, and with a further lug 221 for abutment against the second part 21 of the moulding device; in addition the lower part 222 of the positioning device is adapted for abutment against the blank 10. Henceforth, the expressions upper and lower, right and left, respectively, are used in order to simplify the description, whereby the expressions refer to the orientation of the moulding device and the blank which is shown in the figures. The orientation chosen in the figures, however, is completely arbitrary. This also holds true for the orientation of the moulding devices in FIGS. 4–5.

The first and second parts of the moulding device have surfaces facing one another 201 and 211, respectively. These two surfaces each possess an upper vertical surface portion 202,212 and a lower vertical surface portion 203,213 parallel and displaced in relation to one another by means of steps formed as S-shaped transitional surfaces 204 and 214 respectively. The two S-shaped transitional surfaces 204,214 comprise reshaping devices which in the movement of the first part 20 relative to the second part 21 first displace the material in the lower part of the blank laterally in relation to the material in the upper part of the blank, and then in the continuing relative movement of the parts 20,21 of the moulding device reduce the thickness of material during elongating the blank in the direction relative movement of the parts and with the commencement in the transitional region between the two laterally displaced regions of material. Furthermore, the parallel displacement of the upper, respectively, lower surfaces is so chosen that a vertical plane comprising a continuation of the upper surface portion 202 of the first part of the moulding device is at a distance from the lower surface portion 213 of the second part of the moulding device of an order of magnitude equivalent to the thickness of material in the crystallised material in a preform 13 shaped from the blank. The positioning device 22 consists below the lower of the two lugs 220,221 of a disc 223 whose thickness is the same as the thickness of the blank 10. The disc forms a spacing device between the upper surface portions 202,212 of the moulding device, which thus have a mutual distance virtually equivalent to that of the material thickness of the blank. Moreover, it also holds that a vertical plane comprising a continuation of the lower surface portion 203 of the first part of the moulding device is at a distance from the lower surface portion 213 of the second part of the moulding device equivalent to the thickness of material in the blank. The positioning device 22, the first part 20 of the moulding device and the second part 21 of the moulding device are connected to the drive device and carried in bearings for vertical displacement. The drive devices and bearings are not shown in the figures.

FIGS. 1 a–f and 3a show step-by-step how the blank 10a is reshaped into the preform 13. In FIG. 1a the blank 10 is placed between the two upper surface portions 202,212 and abuts the lower part 222 of the positioning device. The positioning device is moved downwards by the drive devices whereby the lug 220 which abuts the first part 20 of the moulding device moves the part downwards in the figure until the lug 221 of the positioning device strikes the second part 21 (FIG. 1c) of the moulding device. The lower part 222 of the positioning device displaces the blank downwards at the same time, whereby the blank is reshaped for the formation of an upper material region 102 and a lower material region 103. These two material regions are separated by a transitional region 104. The position of the positioning device 22 is now fixed relative to the second part of the moulding device. The first part of the moulding device is moved further downwards by the drive devices, whereby the transitional surface 204 reduces the thickness of material of the transitional region 104 in a ribbon-shaped region 105 to a residual thickness equivalent to the thickness the material obtains in free stretching until flow. The material of the ribbon-shaped region is thereby crystallised and transitional zones 106,107 between non-crystallised and crystallised material are formed. During the continued movement of the first part of the moulding device the lower transitional zone 107 is moved downwards in the lower material region 103 of the blank during crystallisation of the material in the blank and during reduction of the wall thickness of the material to a residual material thickness equivalent to that the material obtains in free stretching until flow. The upper material region 102 of the blank is, once the lug 221 of the positioning device has struck against the second part of the moulding device, completely enclosed by the moulding device, for which reason the shape of the upper material region remains unchanged during the formation of the transitional zones 106,107 and the movement of the lower transitional zone.

FIGS. 2 a–f correspond to FIGS. 1 a–f previously described. Parallel displacement between the upper surface portions and the lower surface portions of the first part 20a of the moulding device and the second part 21a of the moulding device are however larger than in the embodiment which is shown in FIGS. 1 a–f. The positioning device 22a is adapted to this larger parallel displacement. In the position where the left-hand lug 220a of the positioning device 22a abuts the first part of the moulding device, the lowest part of the positioning device 22a forms both a contact surface against the upper edge and against the left-hand lateral surface of the blank 10, and a partial surface 204a in the S-shaped transitional surface 204a in the vicinity of the first part of the moulding device.

The reshaping of the blank for the formation of two laterally displaced material regions 102a,103a and a transitional region 104a located therebetween as well as for crystallisation of the material in the blank is completely analogous with that which has been described in conjunction with FIGS. 1 a–f.

Figure 3A:
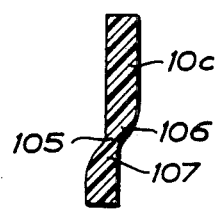
Figure 3B:
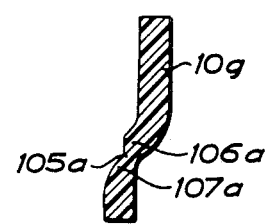

FIGS. 3a and 3b respectively show the blank 10c and 10g respectively when the thickness of the material in the ribbon-shaped region 105 and 105a respectively is reduced to a residual thickness equivalent to the thickness the material obtains in free stretching until flow.

It has been assumed in the above detailed description in conjunction with FIGS. 1–3 that material in a primarily flat blank is reshaped. The aforementioned scheme of movement for the parts of the moulding device, the particularities of mutual spacing, and the thickness of the crystallised and non-crystallised material respectively, is also applicable to blanks of any shape. The following describes application of the invention to tubular blanks where the section at right-angles to the axial direction is of any shape.

FIGS. 4 a–e show a section through a mechanical moulding device 49 for crystallisation of the material in a tubular blank. The figures show the left-hand half without a blank or preform and the right-hand half with a blank or preform.

The figures show a blank 30 in various stages 30 a–d of reshaping into a preform 33. The inner surface of the blank or preform respectively has the reference designation in the figures of 300, respectively 330 and the outer surfaces a designation of 301, respectively 331. FIGS. 4 a–e contain a reception sleeve 43 surrounding a counterhold 42, the upper part of which is disposed with a depression with a bottom surface 420. The surface adjoins the inner surface 430 of the reception sleeve and together with the reception sleeve the bottom surface forms a cup-shaped reception device for reception of the blank 30a. The counterhold 42 is axially displaceable relative to the reception sleevde 43 for adjustment of the depth of the cup-shaped reception device. In the embodiment shown in the figure a central, in the figure downwards oriented, threaded shaft 425 is fixed at the counterhold, and cooperates with a central threaded hole 432 in the reception sleeve 43. A lock nut 426 fixes the shaft 425 and thus the counterhold in the axial position in relation to the reception sleeve to which the counterhold is adjusted.

The reception sleeve 43 is surrounded in turn by a moulding sleeve 40 which is connected by its inner surface 402 to the outer surface 431 of the reception sleeve. The moulding sleeve is disposed with channels 407 for liquid for the transfer of thermal energy to or from the moulding sleeve. By means of drive devices (not shown in the figures) the moulding sleeve is moved axially relative to the said cup-shaped device. The inner surface 430 of the reception sleeve forms at its orifice a rounded (convex) orifice edge surface 434 which continues in the inner surface of the moulding sleeve in the vicinity of the orifice edge of the moulding sleeve. The latter edge has a concave inner orifice edge surface 404, which in the axial position that the cup-shaped reception device assumes relative to the moulding sleeve in FIG. 4a, forms a continuation of the orifice edge surface of the cup-shaped device and together with that surface forms an S-shaped inner orifice edge surface.

A mandrel 41 is disposed for axial movement relative to both the reception sleeve 43, the moulding sleeve 40 and the counterhold 42 (the drive devices are not shown in the figures). Liquid channels 417 are disposed in the mandrel for transfer of thermal energy to or from the mandrel. The mandrel has further an upper part 416 with a primarily cylindrical outer surface 413 and a lower part 415 with a primarily cylindrical outer surface 412 whose circumference is less than that of the upper surface. In addition, there is a transitional surface 414 present in the mandrel, which surface forms the transition between the two primarly cylindrical surfaces 412,413 and has a shape equivalent to the shape of the S-shaped inner orifice edge surface described in the preceding paragraph.

Stops 44 are disposed in the vicinity of the reception sleeve 43 and the moulding sleeve 40, and cooperate with spacer devices 45, adjustable in their axial position, in the vicinity of the mandrel 41. In the embodiment shown in the figures the spacer devices are screwed into holders 450 and fixed in the adjusted position by means of lock nuts 451.

Figure 4A:
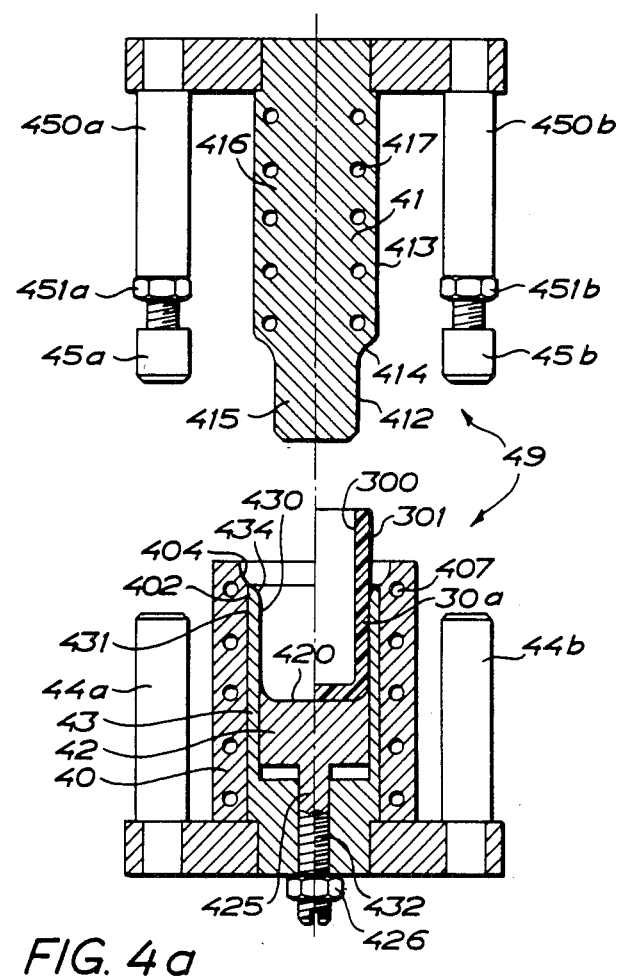
Figure 4B:
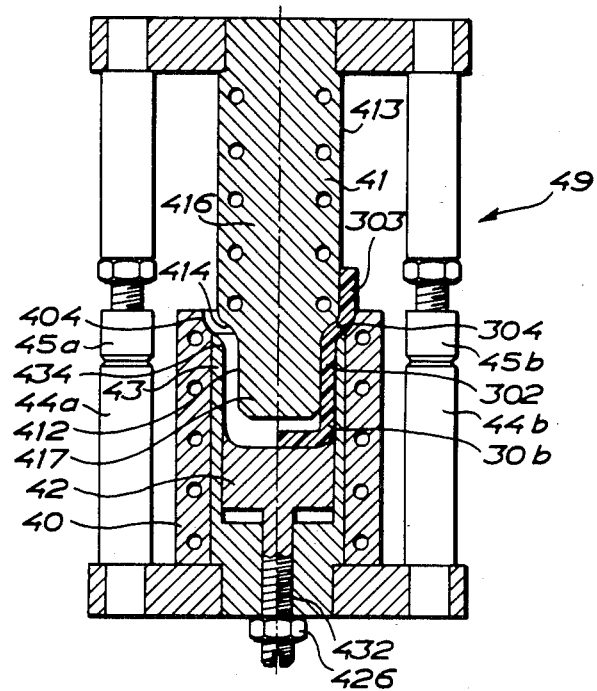
Figure 4C:
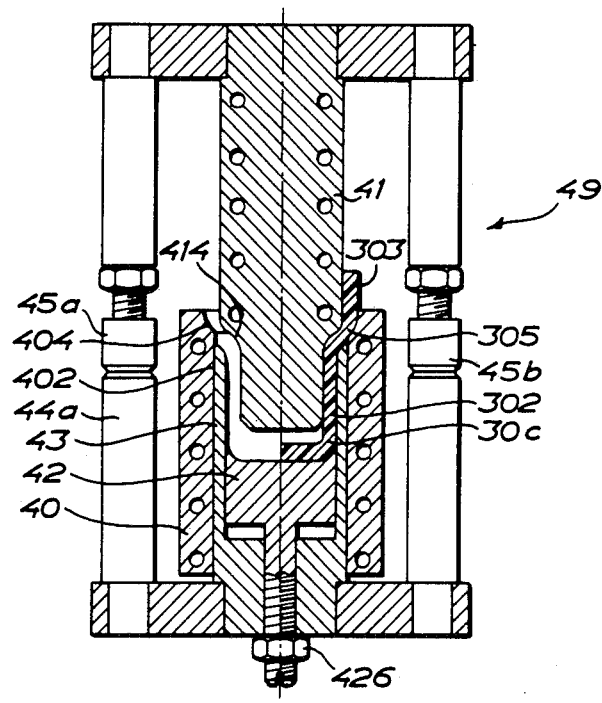
Figure 4D:
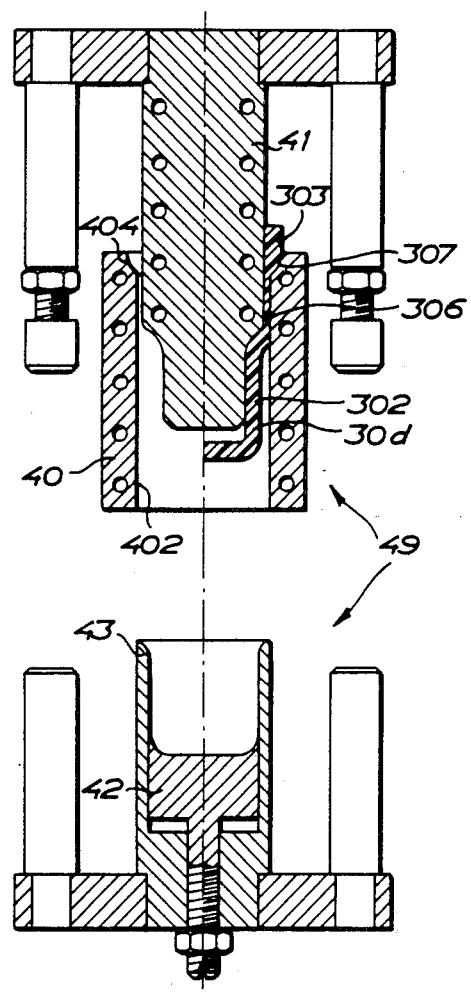

The blank 30a is inserted in the device when the counterhold 42, the reception sleeve 43 and the moulding sleeve 40 are in the axial positions shown in FIG. 4a. The blank 30a will thereby be resting steadily against the bottom surface 420 in the depression of the counterhold, and will be enclosed by the reception sleeve 43. With the adjustment of the aforementioned devices maintained, the mandrel 41 is moved downwards in the figure by the drive devices, and its lower cylindrical surface passes into the blank, whereby the blank 30a is first fixed against the bottom surface 420 and whereafter its upper part is projected outwards through the action of the transitional surface 414 of the mandrel and its upper cylindrical surface 413. The blank thereby obtains an upper cylindrical part 303 and a lower cylindrical part 302 whose circumference is less than that of the upper part, a transitional region 304 (cf FIG. 4b) also being formed between the two parts. By means of the fixing of the blank by the mandrel against the bottom surface 420, it is ensured that the transitional region obtains the correct location in relation to the orifice edge and bottom seal of the blank, respectively. The movement of the mandrel in the direction of the counterhold, reception sleeve and moulding sleeve ceases when the spacer devices 45 meet the stops 44. Adjustment of the position of the spacer devices ensures that the movement of mandrel ceases when the gap-shaped space, that is formed between the mandrel 41 on the one hand and the the moulding sleeve 40 and the reception sleeve 43 on the other, has a width equivalent to the thickness of material in the reshaped blank 30b. The positions of the moulding device correspond to those positions which are described above in conjunction with FIGS. 1c and 2c. Up to now only a reshaping of the material in the blank has thus taken place without the material in the blank being extended in the axial direction of the blank. The increase in the circumference of the upper part of the blank which has occurred is normally of such small extent that it does not cause any noticeable orientation of the material in the circumferential direction of the blank.

The moulding sleeve 40 (cf FIG. 4c) is now moved upwards in the figure with the retention of the distance between the mandrel 41 and the reception sleeve 43 and the counterhold 42. The inner concave orifice edge surface 404 of the moulding sleeve thus approaches the transitional surface 414 of the mandrel 41 and reduces the thickness of material in the transitional region 304 of the blank to a value equivalent to the thickness the material obtains in free drawing until flow. The material thereby crystallises in a ribbon-shaped region 305 (cf FIGS. 1d, 2c, 3a,b) and transitional zones 306,307 to material still not crystallised by reduction in thickness are formed. The moulding sleeve 40 is then moved (cf FIG. 4d) by drive devices further upwards in the figure during simultaneous reduction of the wall thickness and corresponding extension of the blank in its axial direction. Simultaneously with the reduction of the thickness of the material in the upper part the material crystallises. The counterhold 42 and the reception sleeve 43 no longer participate in reshaping the blank and are therefore moved aside.

Figure 4E:
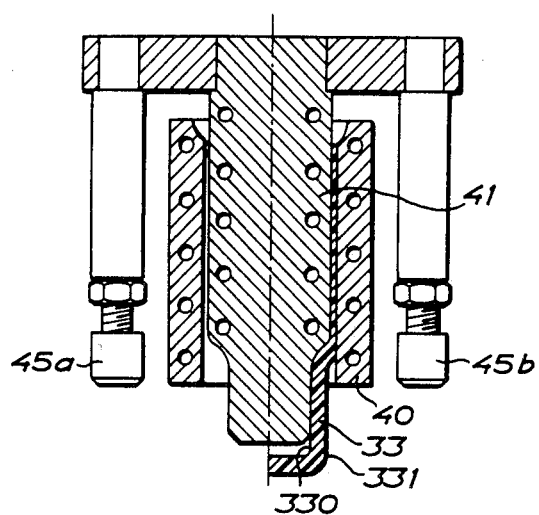

In certain embodiments the movement of the moulding sleeve relative to the mandrel 41 is continued until all the material in the upper part of the blank has undergone reduction in thickness (cf FIG. 4e). By this means a preform is obtained where only the material in the upper part of the preform has undergone reduction in thickness and has thus attained stretch crystallisation. The preform is then removed from the equipment. A container is shaped from the preform produced where orifice, neck, chest and container body consist of material stretch-crystallised in the axial direction of the container. In the container moulded the material of the aforementioned parts has a crystallisation where the stretch crystallisation that has occurred in the reshaping of the blank into the preform contributes around 10–17% of the total crystallisation in the material of the wall of the container. In other examples of application the preform produced constitutes the required final product.

In such examples of application where an orifice edge of non-stretch-crystallised material in the preform produced is required, the movement of the moulding sleeve is interrupted before all the material in the upper part of the blank has undergone reduction in thickness. The material in the orifice edge is then thermocrystallised in certain examples of application in order to form an upper ring of exceptionally stiff material suitable e.g. to be grasped by a crown cork.

In certain examples of application, above all where it is desired to utilise already existing equipment, a blank is injection-moulded with an orifice section provided with threads and where the wall of the blank in the region adjacent to the orifice section has an inner or outer transitional surface to a material region of lesser circumference than that of the region nearest above it. The region next to the orifice section is stretch-crystallised with the application of the technique described above, after which the preform produced is reshaped into a container in accordance with conventional blowing techniques.

A number of embodiments of the invention have been described above in which it may be clearly seen that the latter contains possibilities of virtually any desired extension of the material regions that undergo stretch crystallisation and of virtually any desired axial length therein.

FIGS. 5 a–e show a section through a version of a mechanical moulding device 59 for crystallisation of material of a tubular blank. The figures show the moulding device in successive working positions for crystallisation of material in the blank. The figures are symmetrical around a vertical line of symmetry. The left-hand half of the figures shows the device without a blank 60 or preform 63 and the right-hand half the device with a blank or preform.

The figures also show the blank 60 in various stages 60 a–d of reshaping into the preform 63. The inner surface of the blank has the reference designation 600 and its outer surface the reference designation 601. The designations 630 and 631 respectively are used for the corresponding surfaces of the preform.

FIGS. 5 a–e contain a reception sleeve with an inner surface 520, which forms a cup-shaped device for reception of the blank 60a.

A drawing mandrel 50 is disposed above the reception sleeve, and its lower part terminates in a counterhold 507 with an outer limitation surface 508 with a shape matched to the inner surface of the blank in the enclosed part. The drawing mandrel has an upper part with a primarily cylindrical outer surface 502 and a lower part with a primarily cylindrical outer surface 503 of a larger circumference than that of the upper outer surface. The two cylindrical surfaces are joined together by a transitional surface 504. The counterhold 507 is axially displaceable relative to the drawing mandrel in that the counterhold is attached to the lower part of a sliding rod 505 which runs in a central, cylindrical cavity in the drawing mandrel. A stop device 509 disposed on the sliding rod determines the end position of the downward motion of the sliding rod, and thus the lowest position of the counterhold.

The drawing mandrel 50 is enclosed at least in the region of the upper part of the lower cylindrical surface 503, the transitional zone 504, and the lower part of the upper cylindrical surface 502, by a reshaping sleeve 51 whose inner surface forms a gap with the outer surfaces of the drawing mandrel, which gap has a width agreeing primarily with the blank wall thickness. The inner surface of the reshaping sleeve thus also has a primarily cylindrical inner surface 512 and a lower part with a primarily cyindrical inner surface 513 of larger circumference than that of the upper inner surface. The two cylindrical surfaces are connected to one another by means of a transitional surface 514.

Moreover, a retainer device 54 is fixed to the reshaping sleeve 51, into which device the upper part of the sliding rod 505 is screwed and fixed by means of a nut. This construction causes the distance of the counterhold 507 from the reshaping sleeve 51, and especially from its transitional surface 514, to be adjustable. The construction shown comprises only one example of how such regularable adjustment of the distance between the counterhold 507 and the reshaping sleeve 51 can be achieved.

The reshaping sleeve 51 is carried in bearings in sliding devices (not shown in the figures) along which the reshaping sleeve with a fixed sliding rod 505 and a counterhold 507 disposed on the sliding rod is moved in the axial direction of the reshaping sleeve to and from a position (cf FIG. 5b) in which the reshaping sleeve abuts the reception sleeve 52 and where between the lower cylindrical surface 503 of the drawing mandrel and the outer limitation surface 508 of the counterhold on the one hand and the inner surface 520 of the reception sleeve on the other hand, there is formed a gap with a width agreeing primarily with the material thickness of the blank 60. The said gap is connected to and continues in the previously described gap between the drawing mandrel 50 and the reshaping sleeve 51.

Figures 5A, 5B:
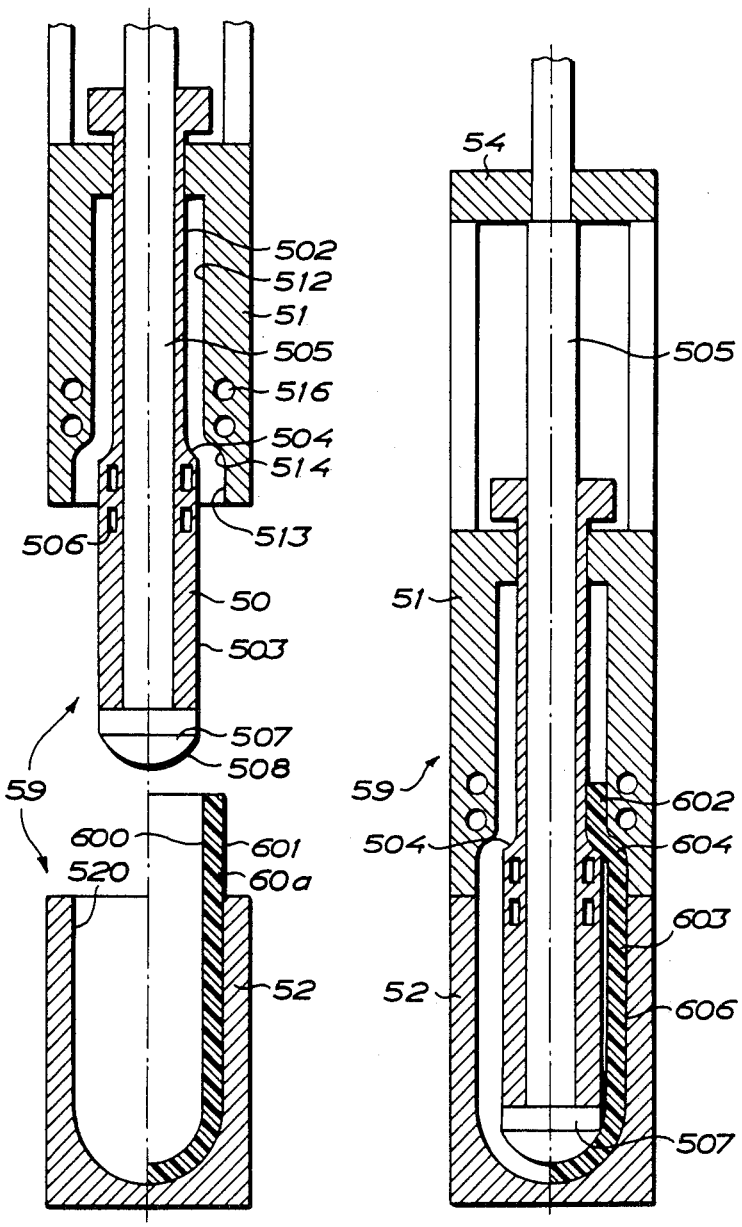
Figure 5C:
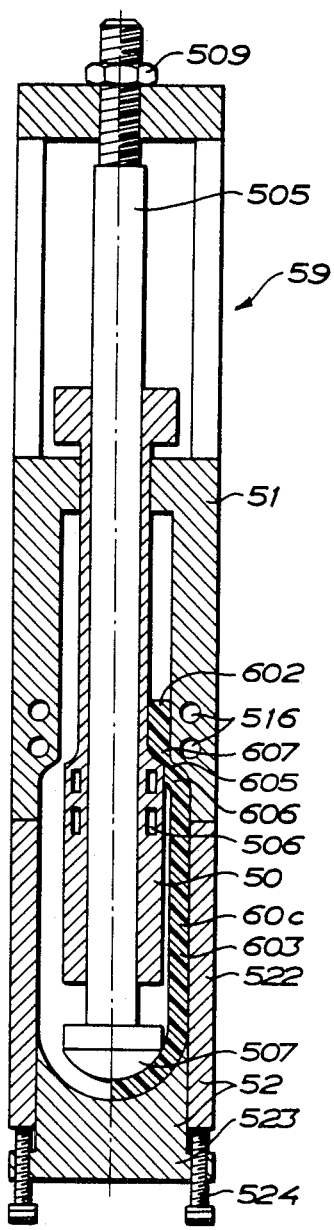
Figure 5D:
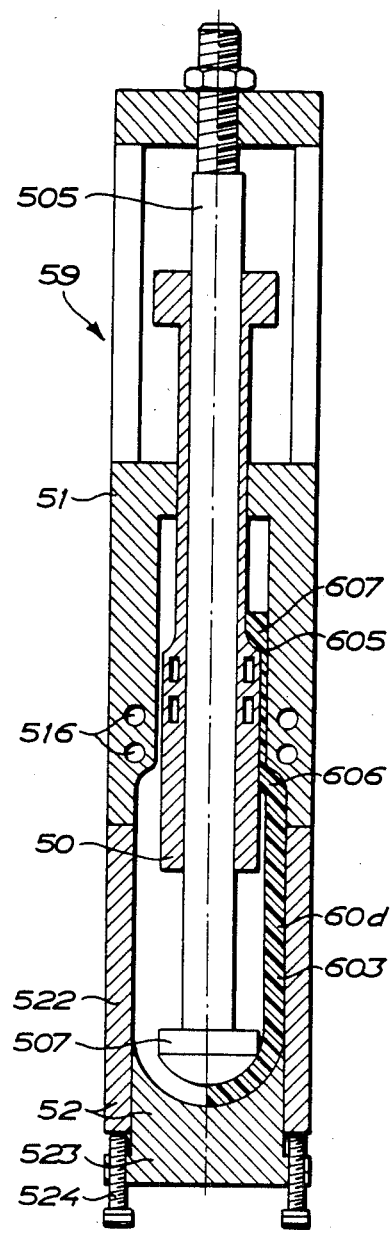
Figure 5E:
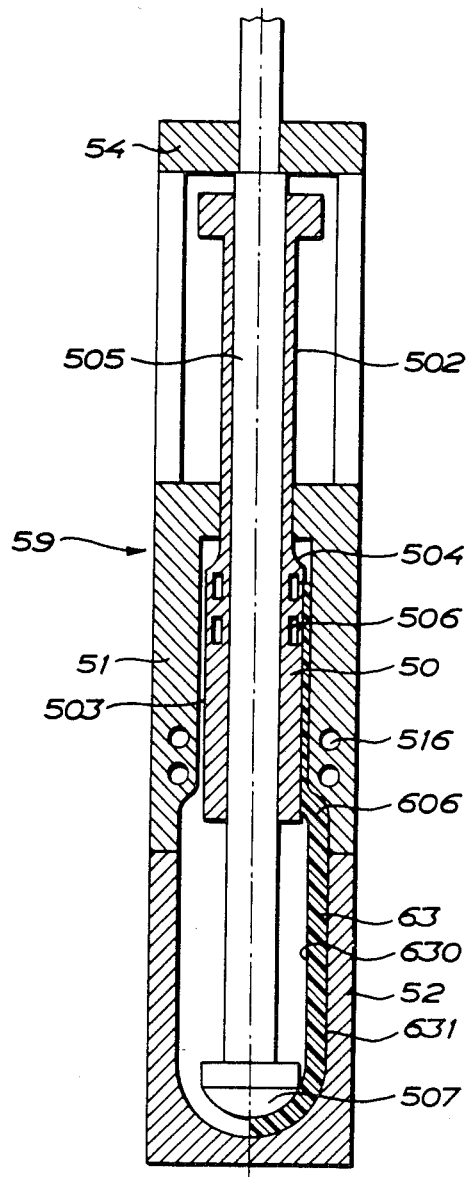

FIGS. 5c and 5d show a version of the mechanical moulding where the reception 52 consists of a primarily cylindrical sleeve part 522 and a bottom part 523 located therein with a cup-shaped upper limitation surface adapted to the shape of the bottom seal of the blank. By means of adjuster screws 524 the bottom part is adjusted in the axial direction in relation to the cylindrical sleeve part 522 and thus in relation to the reshaping sleeve 51 when it is connected to the reception sleeve 52. Both the reshaping sleeve and the drawing mandrel 50 are disposed with channels 516 and 506 respectively for transferring liquid for the supplying and/or removal of thermal energy from the sleeve and the drawing mandrel respectively. In order not to complicate the figures unnecessarily the channels are only shown in FIGS. 5c and 5d.

In order to reshape a blank 60a into a preform the blank is placed in the reception sleeve 52 (cf FIG. 5a), after which the drawing mandrel 50 and the counterhold 507 are moved by drive devices (not shown in the figures) in the direction of the reception sleeve to a position where the blank is fixed by the counterhold 507 against the bottom part 523 of the reception sleeve and where the transitional surface 504 of the drawing mandrel 50 assumes a position that with the continued reshaping of the blank determines where the transitional region 604 of the blank is to be formed. The reshaping sleeve 51 is then moved by drive organs to abut the reception sleeve 52 whereby the upper part of the blank is enclosed by the lower inner surface 513 of the reshaping sleeve and whereby the transitional surface 514 of the reshaping sleeve in the continued movement of the reshaping sleeve projects the material in the upper part of the blank into the gap that is located between the upper cylindrical surface 512 of the reshaping sleeve and the upper cylindrical surface 502 of the drawing mandrel (cf FIG. 5b). This projection gives the blank an upper primarily cylindrical material region 602 of a lesser circumference than that of the lower primarily cylindrical material region 603 of the blank. The two material regions are separated by the transitional region 604. The positions of the moulding device correspond to those described above in conjunction with FIGS. 1c and 2c.

The drawing mandrel is then moved (cf FIG. 5c) upwards in the figure by drive devices (not shown in the figures), whereby the thickness of material in a ribbon-shaped region 605 in the transitional region between the upper cylindrical portion 602 of the blank and the lower cylindrical portion 603 of the blank is reduced to a thickness equivalent to the thickness the material obtains in free stretching until flow. By this means the material in the ribbon-shaped region is crystallised and transitional zones 606,607 are formed between material of unchanged thickness and crystallised material. During the continued axial movement of the drawing mandrel relative to the reshaping sleeve 51 the upper transitional zone 607 is moved upwards in the figure simulaneous elongation of the blank in its axial direction and during crystallisation of the material in the inwardly projected material region of the blank. During the crystallisation of the blank the outer diameters of the blank, obtained by means of inward projection, are retained unchanged.

When the reduction in thickness of all material in the upper part of the blank is completed and all material in the upper part is crystallised, there is thus formed a blank with a lower part of material which has not undergone any stretch crystallisation and with an upper part consisting of material which has undergone such crystallisation.

In conjunction with FIGS. 4–5 the blank has been shown with a sealed bottom part. The technique described is however also applicable to tubes open at both ends. For example, compare the embodiment disclosed in FIG. 4, where the bottom seal of the blank does not cooperate during the reshaping and crystallisation process, but only comprises a means of placing the blank in the correct position in the reshaping and crystallisation device.

In the description of the FIGS. 4–5 the expressions cylindrical shape, cylindrical surface, diameter etc. have been used. As has already been pointed out the invention is, however, applicable to tubular blanks, both open and sealed, of any desired cross-section, e.g. square, rectangular, polygonal, or a cross-section with a curved close or open limitation etc.

The position of the transitional region 304,604 between the material regions 302,602 and 303,603 respectively, displaced laterally in relation to one another, can be chosen virtually anywhere in the axial direction of the preformed blank. This also allows material in the material region 302 nearest to the bottom seal to be utilised where necessary for the bottom of the container that is moulded from the preform.

In achieving the ribbon-shaped region 105,305,605 of crystallised material and in the continued crystallisation of the material in the blank by movement of the transitional zones, 106,107;306,307;606,607 the temperature of the material is not permitted to exceed a maximum value. In order to achieve this at least those surfaces in the moulding device which abut material in the transitional zones and/or crystallised material are maintained at a temperature not exceeding 125° C. and preferably at a temperature in the range 70°–105° C.

It has surprisingly been shown that the sought-for effect is attained even when the distance between the first parts 20,40,50 of the moulding device and its second parts 21,41,51 in the movement of the transitional zone is less than the thickness the material would obtain in free stretching until flow. Even in this case there thus form stretch-crystallised material regions in conjunction with the reduction in the thickness of the material.

In all embodiments disclosed above and related to a tubular preform the transitional region and the transitional zones have been obtained by reshaping on upper part, connected to the mouth of the blank. It has, however, surprisingly proven, that according to the invention the transitional region and the transitional zones are obtained by reducing the circumference of the lower (bottom)part of the blank. The stretching and crystallisation of the material will afterwards be made in accordance with the technique already disclosed. Especially for preforms of large axial length it is of advantage to obtain the transitional region by reshaping the lower part of the blank.

We claim:

1. A method of forming a preform having crystallized thermoplastic material from a blank of orientable thermoplastic material, said method comprising:

providing an elongated blank of orientable thermoplastic material having a given length and thickness, said blank having opposite outer surfaces, positioning first and second mold parts at the opposite outer surfaces of the blank, the mold parts being relatively movable lengthwise of the blank, said mold parts each having first and second contact surfaces at different levels with a step joining the contact surfaces and forming a transitional surface between said contact surfaces, the mold parts being positioned with the first surfaces thereof on the outer surfaces of the blank and with said transitional surfaces facing one another, relatively moving the mold parts lengthwise of the blank to cause said transitional surfaces to approach one another and cause said blank to be laterally displaced over the steps and be engaged by said transitional surfaces over a portion of the thickness of the blank at respective engagement surfaces, continuing the relative movement of said mold parts such that said transitional surfaces pass one another and travel longitudinally away from one another and cause the material of the blank to be reduced in thickness in an intermediate region in the blank between said engagement surfaces while said intermediate region concurrently is increased in length, said thickness being reduced to a value which the material would obtain if freely stretched to flow, thereby to achieve crystallization of the material in said intermediate region, said old parts, at said engagement surfaces, forming transitional zones between the oriented material of said intermediate region and remaining orientable material of the blank in two end regions respectively extending lengthwise from said intermediate region at opposite ends thereof, one of said transitional zones being moved lengthwise of the blank during the relative movement of the mold parts while orientable material of the blank passes through said one transitional zone to said intermediate region from the end region associated with said one transitional zone, whereby orientation of material is produced in said intermediate region by longitudinal travel of said one transitional zone and flow of material through said one transitional zone from said end region associated with said one transitional zone.

2. A method as claimed in claim 1 wherein said end regions of orientable material are transversely offset from one another and said intermediate region of oriented material extends longitudinally between said end regions and is joined thereto by said transitional zones.

3. A method as claimed in claim 1 comprising engaging said blank at one end thereof to hold said end in place during formation of said intermediate region.

4. A method as claimed in claim 1 wherein the blank is tubular and has inner and outer surfaces, said intermediate region being an annular portion of the tubular blank, one of the surfaces of said intermediate region being an annular surface at the inner surface of the tubular blank the other of the surfaces of said intermediate region being an annular surface at the outer surface of the tubular blank, said annular surfaces undergoing relative axial movement during the reduction in thickness and elongation in length of said material in said one region.

5. A method as claimed in claim 4 wherein said tubular blank has a closed end whose material remains substantially unchanged and orientable.

6. A method as claimed in claim 4 comprising injection molding said blank with concurrent formation of said intermediate region.

7. A method as claimed in claim 1 wherein the first mold part engages the outer surface of the intermediate region at the outer surface of the annular blank and applies a pushing force to displace said outer surface of the intermediate region axially of said tubular blank to produce and displace said one transition zone while reducing the thickness and elongating the length of the material of said intermediate region and concurrently reducing the length of the orientable material in said end region associated with said one transition zone.

8. A method as claimed in claim 1 wherein the second mold part engages the surface of the intermediate region at the inner surface of the annular blank and applies a pulling force to displace said surface of the intermediate region axially of said tubular blank to produce and displace said one transition zone while reducing the thickness and elongating the length of the material of said intermediate region and concurrently reducing the length of the orientable material in said end region associated with said one transition zone.

9. A method as claimed in claim 1 wherein the thermoplastic material is polyethylene terephthalate and comprising heating the material to a temperature below 125° C.

10. A method as claimed in claim 9 wherein the material is heated to a temperature of 70°–105° C.

* * * * *